United States Patent [19]

Matsumoto

[11] Patent Number: 4,883,371
[45] Date of Patent: Nov. 28, 1989

[54] BEARING SYSTEM FOR A WHEEL

[75] Inventor: Masaaki Matsumoto, Osaka, Japan

[73] Assignee: Koyo Seiko Co., Ltd., Osaka, Japan

[21] Appl. No.: 272,852

[22] Filed: Nov. 18, 1988

[30] Foreign Application Priority Data

Nov. 19, 1987 [JP] Japan .................... 62-176672

[51] Int. Cl.⁴ ........................... F16C 19/38
[52] U.S. Cl. .................... 384/559; 384/584; 384/571; 384/589
[58] Field of Search ........... 384/559, 560, 510, 584, 384/537, 571, 569, 589

[56] References Cited

U.S. PATENT DOCUMENTS

| | | | |
|---|---|---|---|
| 3,782,796 | 1/1974 | Rickley et al. | 384/584 |
| 4,203,635 | 5/1980 | Reiter | 384/560 |
| 4,647,231 | 3/1987 | Harsdorff | 384/560 |
| 4,783,182 | 11/1988 | Caron et al. | 384/510 |

FOREIGN PATENT DOCUMENTS 55-117626 8/1980 Japan .

Primary Examiner—Lenard A. Footland
Attorney, Agent, or Firm—Finnegan, Henderson, Farabow, Garrett, & Dunner

[57] ABSTRACT

A bearing arrangement for a wheel of a vehicle is provided, comprising a cylindrical hub integrally formed with a flange connected to the wheel, extending axially outward enclosed in a second flange. The second flange further encloses a bearing seat proximate the hub, and a double row anti-friction bearing including roller elements travelling in a single outer race and twin inner races. The union between the second flange and the cylindrical hub forms a shoulder containing at least two grooves. The grooves are configured to receive a removal tool, used to pry the inner races away from the hub. The diameter of the shoulder can either be equal to or larger than the diameter of the inner race. The strength of the hub can thus be enhanced without increasing the pressure on the races, maintaining easy removal capability.

3 Claims, 3 Drawing Sheets

BEARING SYSTEM FOR A WHEEL

BACKGROUND OF THE INVENTION

1. Field of the Invention

The present invention relates to a bearing system for a wheel of a motor vehicle or the like.

2. Description of the Related Art

FIG. 3 shows a conventional bearing system for a wheel of a motor vehicle. The conventional bearing system includes a hub 4 having a flange 3 secured either to the wheel or to a support member on the vehicle body. The hub extends outward in the radial direction of the wheel at one end of a cylindrical portion 2, having a bearing seat 1 proximate the outside circumferential surface of the portion. A separable double row anti-friction bearing 9 includes rolling elements 5 rotatably disposed between an outer race 7, and a pair of inner races 8 fitted on the bearing seat of the hub. Outer race 7 is provided for two raceway trucks for the rolling elements, and is further integrally formed with a flange 6, located on the outside circumferential surface of the outer race and secured either to the wheel or to the support member and not to the flange 3. The outside diameter of the shoulder 10 of the hub 4 is configured smaller than that of each of the inner races 8. This configuration enables a pull-off tool to engage with the side surface of the inner race on the shoulder, in order to pull off the inner race from the hub and disassemble the hub and the bearing 9 from each other. A bearing system of this kind was disclosed in the Japanese Utility Model Application (OPI) No. 117626/80 (the term "OPI" as used herein means an "unexamined published application").

The strength of the hub 4 of the conventional bearing system needs to be maintained or enhanced. However, if the rim between the side surface 10′ of the shoulder 10 and the bearing seat 1 of the cylindrical portion 2, and the inner circumferential edge of the inner race 8 located on the shoulder are enlarged in order to maintain or enhance the strength of the hub 4, the surface pressure between the side surface 8′ of the inner race and that of the shoulder 10′ is increased, thereby adversely affecting the strength of the hub. Further, if the outside diameter of the shoulder 10 is made nearly equal to or larger than that of the inner race 8 in order to decrease the surface pressure between the side surface 8′ of the inner race and that of the shoulder 10′, it is difficult to disengage the inner race from the hub 4 after the bearing system is assembled. A solution to this problem is required.

The present invention was made in order to solve this problem.

It is therefore an object of the present invention to provide an enhanced strength bearing system for the wheel of a vehicle.

It is a further object of the present invention to provide an enhanced strength bearing system which can be easily disassembled.

Additional objects and advantages will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as broadly described herein, a bearing system is provided, comprising a hub integrally formed with a flange secured to a wheel of a vehicle and a support member on the body of the vehicle. The hub extends outward in the axial direction of the wheel at one end to form a cylindrical portion, having a bearing seat on the outside circumferential surface of the portion, and a separable double row anti-friction bearing. The anti-friction bearing includes rolling elements rotatably disposed between an outer race, and a pair of inner races fitted on the bearing seat. The outer race is provided for two raceway trucks for the rolling elements, and is integrally formed with a flange located on the outside circumferential surface of the outer race and secured to another wheel and support member. The bearing system is characterized in that the joint of the cylindrical portion of the hub and the flange thereof constitutes a shoulder; the outside diameter of the shoulder is configured substantially equal to or larger than that of the side surface of the inner race located on the shoulder; and the shoulder or the inner race located thereon has at least two notches at the outer circumferential edge of the side surface of the shoulder on the inner race or at the outer circumferential edge of the side surface of the inner race on the shoulder. A tool for pulling off the inner race can easily be engaged in the notches.

It is further preferable that the notches of the shoulder of the inner race, in accordance with the present invention, can be engaged with a removal tool in order to pull off the inner race from the hub in the axial direction thereof to disassemble the hub and the separable double row anti-friction bearing from each other.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Embodiments of the present device are hereafter described with reference to the accompanying drawings.

Figure 1:
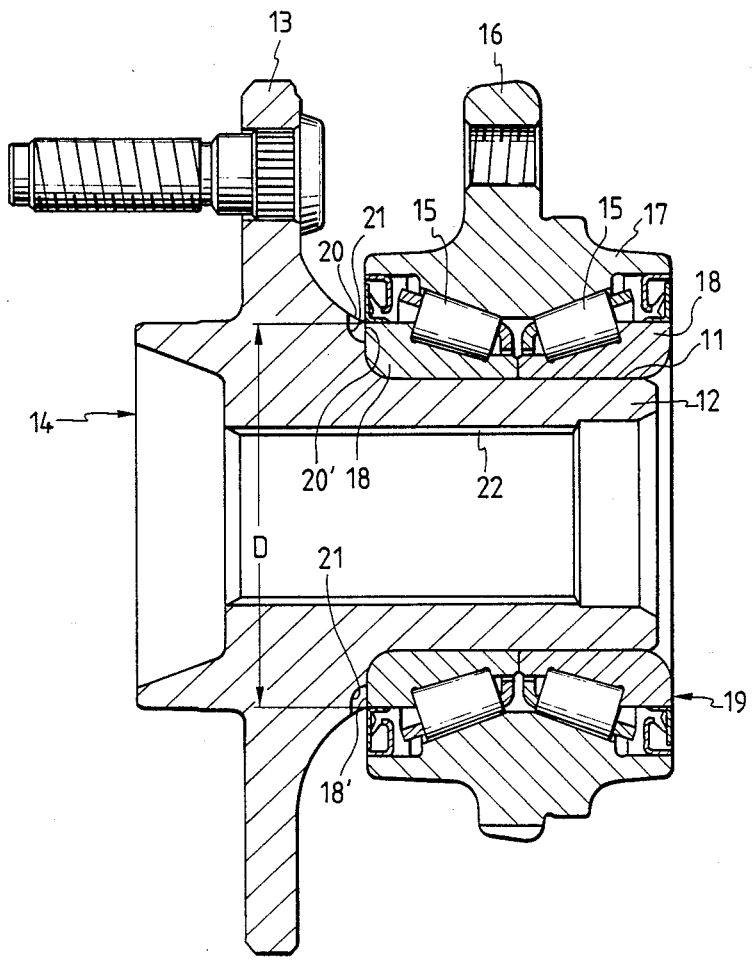
FIG. 1 shows a longitudinal sectional view of a first embodiment of a bearing system incorporating the teachings of the invention, for a driving wheel.

FIG. 1 shows a longitudinal sectional view of a first embodiment of a bearing system incorporating the teachings of the present invention, for the driving wheel of a vehicle (not shown). The bearing system comprises a hub 14 integrally formed with a flange 13 secured to the wheel and extending outward in the axial direction of the wheel at one end to form a cylindrical portion 12. A bearing seat 11 is provided on the outside circumferential surface of the portion. A separable double row anti-friction bearing 19 includes rolling elements 15, rotatably disposed between an outer race 17, provided for two raceway trucks for rolling elements, which is integrally formed with a flange 16. Flange 16 is located on the outside circumferential surface of the outer race and secured to a support member on the body of the vehicle. The rim between the cylindrical portion 12 of the hub 14 and the flange 13 thereof constitutes a shoulder 20 over the bearing seat 11, on which the inner races 18 are fitted. The outside diameter D of the shoulder 20 is configured substantially the same as that of the side surface 18' of the inner race 18. The shoulder 20 has a minimum of two notches 21 at the outer circumferential edge of the side surface 20' of the shoulder, which are located in contact with the side surface 18' of the inner race 18. A pull-off tool (not shown) can be engaged in the notches 21 in order to remove the inner race 18 on the shoulder 20 from the hub 14, in the axial direction thereof, to disassemble the hub and the bearing 19. Splines 22 are formed on the inside circumferential surface of the cylindrical portion 32 of the hub 14. Splines formed on the shaft of a constant velocity joint (not shown) are engaged with the splines 22 to transmit motor power. The outside diameter D of the shoulder 20 may be made larger than that of the inner race 18 located on the shoulder. The inner race 18 on the shoulder 20 may have the notches 2 at the outer circumferential edge of the side surfaces 20' of the shoulder.

Figure 2:
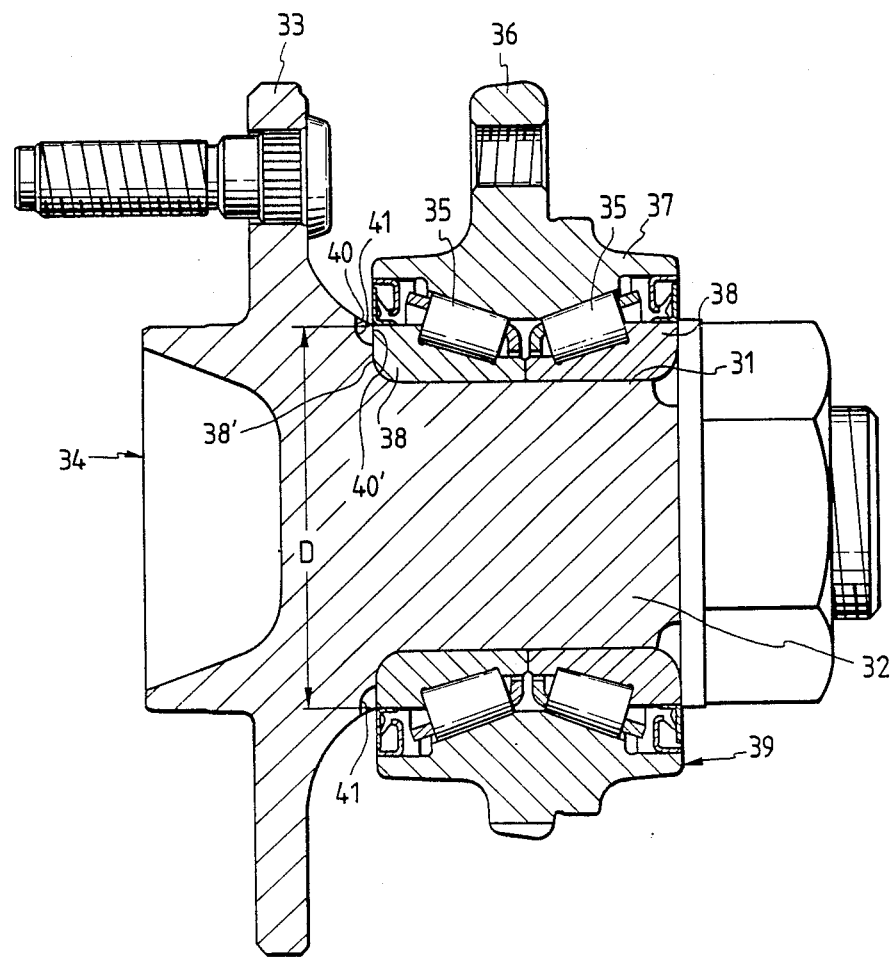
FIG. 2 shows a longitudinal sectional view of a second embodiment of a bearing system incorporating the teachings of the present invention, for a non-driving wheel.
Figure 3:
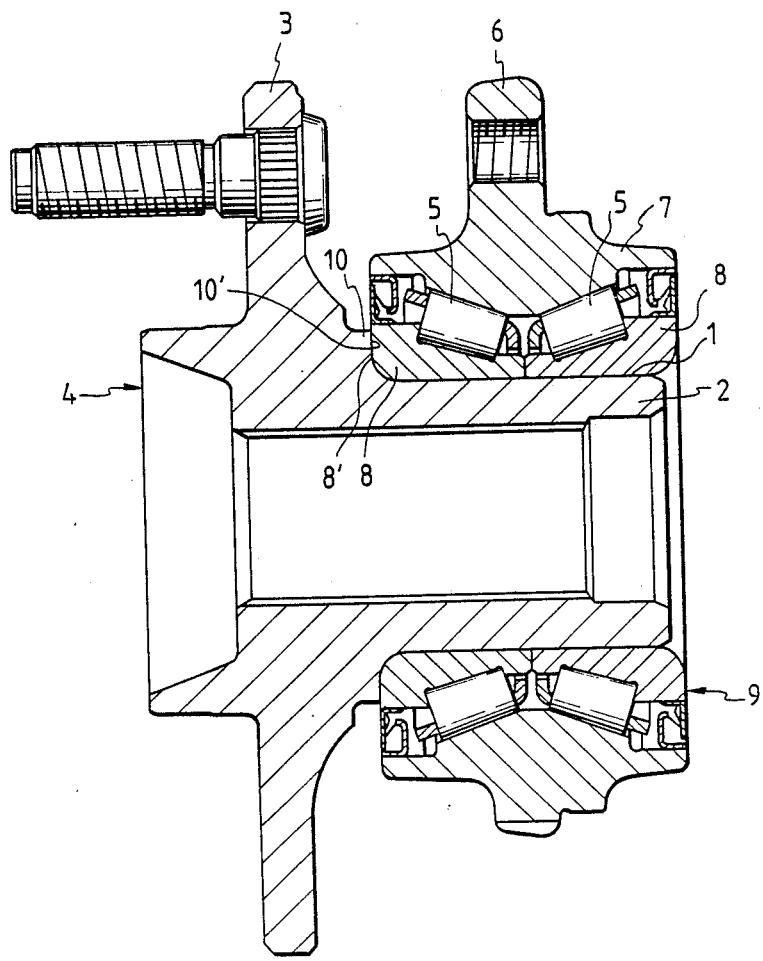
FIG. 3 shows a longitudinal sectional view of a conventional bearing system for a driving wheel.

FIG. 2 shows a longitudinal sectional view of a second embodiment of a bearing system incorporating the teaching of the present invention, for the non-driving wheel of a vehicle (not shown). This embodiment comprises a hub 34, integrally formed with a flange 33 secured to a support member on the body of the vehicle, extending outward in the radial director of the wheel at one end of a cylindrical portion 32. A bearing seat 31 is provided on the outside circumferential surface of the portion. A separable double row anti-friction bearing 39 including rolling elements 35 rotatably disposed between an outer race 37, and a pair of inner races 38 fitted on the bearing seat of the hub. Outer race 37 is provided for two raceway trucks for rolling elements, and is integrally formed with a flange 36. Flange 36 is located on the outside circumferential surface of the outer race and secured to the wheel. The joint of the cylindrical portion 31 of the hub 34 and the flange 33 thereof constitutes a shoulder 40. The outside diameter D of the shoulder 40 is configured substantially the same as that of the inner race 38 located on the shoulder. The shoulder 40 has a minimum of two notches 41 at the outer circumferential edge of the side surface 38' of the inner race 38, which is located on the side surface 40' of the shoulder. A pulloff tool (not shown) can be engaged in the notches 41 in order to remove the inner race 38 on the shoulder 40 of the hub 34 from the hub in the axial direction thereof, to disassemble the hub and the bearing 39. The outside diameter D of the shoulder 40 may be made larger than that of the inner race. 38 located thereon. The inner race 38 located on the shoulder 40 may have the notches 41 at the outer circumferential edge of the side surface 38' of the inner race.

Each of the separable double row anti-friction bearings 9 in the above-described embodiments is a tapered roller bearing having opposing two raceway trucks for tapered rollers, or a double row angular-contact ball bearing having opposing two raceway trucks for balls.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the applicants' general inventive concept.

What is claimed is:

1. A bearing assembly for a wheel of a vehicle, comprising:

a hub having a first flange portion for securing at one end either to the wheel or a support member of the vehicle, said first flange portion having a first predetermined diameter, said hub having an axially extending cylindrical portion with an outer peripheral surface of a second predetermined diameter less than the first diameter, forming a substantially radially extending wall adjoining the first flange portion, defining a shoulder portion with said first diameter;

a first member having an inner peripheral surface comprising a bearing seat engaging with the outer peripheral surface of the cylindrical portion;

a second member having a second flange concentrically mounted relative said first member for securing either to the wheel or the support member and not to said first flange; and a separable double row anti-friction bearing, including rolling elements rotatably disposed between a circular outer race formed on an inner peripheral surface of the second member, and circular inner races formed on an opposing outer peripheral surface of the first member;

said first member having a radial dimension extending from the bearing seat at least substantially equal to the radial dimension of said wall;

wherein at least one of the shoulder portion and the outer peripheral surface of the first member adjacent the shoulder has at least two notches for exposing radially extending surfaces of the hub and first member.

2. The bearing assembly of claim 1, further comprising:

spline means provided on an inner circumferential surface of the cylindrical portion for engagement with splines on an adjacent constant velocity joint to transmit motive power.

3. The bearing assembly of claim 1, wherein said rolling elements are tapered rollers.

* * * * *